United States Patent [19]

Hasegawa et al.

[11] Patent Number: 4,909,978
[45] Date of Patent: Mar. 20, 1990

[54] APPARATUS FOR FORMING A BLOWN BOTTLE WITH A HANDLE AND METHOD OF FORMING THE SAME

[75] Inventors: Hideo Hasegawa; Toshio Takahashi; Masayuki Miyagawa, all of Hiratsuka, Japan

[73] Assignee: Mitsubishi Plastics Industries Limited, Tokyo, Japan

[21] Appl. No.: 192,927

[22] Filed: May 12, 1988

[51] Int. Cl.$^4$ .................. B29C 49/20; B29C 49/36; B29C 49/64

[52] U.S. Cl. .................. 264/516; 264/535; 264/538; 425/503; 425/525; 425/534

[58] Field of Search .............. 264/516, 535, 538; 425/503, 526, 528, 533, 534, 525

[56] References Cited

U.S. PATENT DOCUMENTS

| | | | |
|---|---|---|---|
| 3,140,329 | 7/1964 | Nutting | 264/274 |
| 3,575,949 | 4/1971 | Humphrey | 264/516 |
| 4,123,217 | 10/1978 | Fischer et al. | 425/324.1 |
| 4,280,805 | 7/1981 | Hafele | 264/538 |
| 4,604,044 | 8/1986 | Hafele | 425/525 |

FOREIGN PATENT DOCUMENTS 2613735  10/1977  Fed. Rep. of Germany ...... 264/516

Primary Examiner—Jan H. Silbaugh
Assistant Examiner—Neil M. McCarthy
Attorney, Agent, or Firm—Oblon, Spivak, McClelland, Maier & Neustadt

[57] ABSTRACT

A method of forming a blown bottle with a handle as a one-piece-molded product, wherein a thermoplastic parison and a handle are held in correct positional relationship by respective holders and are simultaneously moved in a blow mold to be subjected to blow molding. The parison is blow molded by injecting a pressurized fluid into it. Blow molding results in connection of the parison with the handle.

5 Claims, 5 Drawing Sheets

FIGURE 3
FIGURE 4
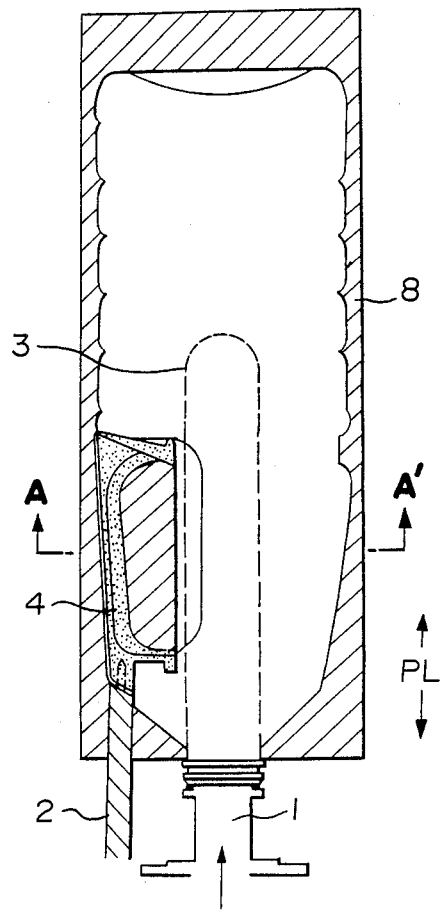
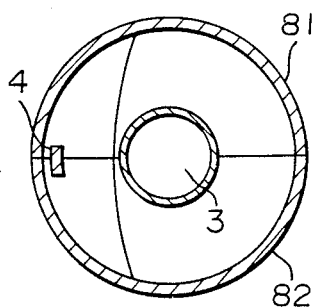

APPARATUS FOR FORMING A BLOWN BOTTLE WITH A HANDLE AND METHOD OF FORMING THE SAME

BACKGROUND OF THE INVENTION

The present invention relates to an apparatus for and a method of forming a thermoplastic bottle with a handle.

DISCUSSION OF THE BACKGROUND

It has been known that it is difficult to form a thermoplastic bottle with a handle by blow-molding a single parison of a material such as polyethylene terephthalate.

There is a proposal in a publication, for instance, Japanese Unexamined Patent Publication No. 99350/1983 to form the blown bottle with a handle in such a manner that a parison and a handle are separately formed; the handle is first put on a handle holder placed at a predetermined position in a blow mold; then, the parison is put in the blow mold; and thereafter, blow molding is carried out.

In the conventional method, however, an additional device is required to move the handle holder since the handle is fixed at a predetermined position by the handle holder separate from the parison. Further, there is easily caused an error in positional relation between the handle and the parison since the parison is moved after the handle is fixed. As a result, there takes place a deviation in position where the handle is attached to the blown bottle.

SUMMARY OF THE INVENTION

It is an object of the present invention to provide an apparatus for and a method of forming a blown bottle with a handle having a correct positional relation.

In one aspect of the present invention, there is provided a method of forming a blown bottle with a handle which is a one-piece-molded product by blowing a pressurized fluid into a thermoplastic parison heated at a temperature suitable for molding which is placed in a blow mold together with the handle, the method being characterized in that the parison and the handle are previously held with a correct positional relation and they are simultaneously moved in the blow mold to be subjected to blow molding.

In another aspect of the present invention, there is provided an apparatus for forming a blown bottle with a handle which comprises:

a circularly transferring unit, a first holder attached to the transferring unit to hold a parison vertically, a second holder attached to the transferring unit to hold a handle so that the handle is at a predetermined position with respect to the parison, a heating unit to heat the parison, a blow mold which receives the parison and the handle on the first and second holders, and an air-blowing unit to supply pressurized air to the parison when it is in the blow mold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a longitudinal cross-sectional view of a blow mold;

FIG. 4 is a cross-sectional view taken along a line A-A' in FIG. 3;

DESCRIPTION OF THE PREFERRED EMBODIMENT

In the present invention, a parison in a tubular form with a bottom wall is used. The parison is formed either by injection molding of synthetic resin such as polyethylene terephthalate or by an extrusion method after which one end of tubular product is closed.

The handle may be formed by injection molding of synthetic resin such as polypropylene, polyethylene and so on.

In the present invention, the parison and the handle are held with a correct positional relation. For this, a holder for holding the parison and a holder for holding the handle are attached on the same transferring unit at predetermined positions, and they are simultaneously moved in the blow mold in the state that they respectively hold the parison and the handle. The parison holder may have a rotatable mandrel and the handle holder may be in a non-rotatable state so that only the parison is caused to rotate while being heated at a forming temperature before it is moved in the blow mold.

Alternatively, the parison and the handle are injection-molded by using a forming mold in which a cavity for the parison and a cavity for the handle are formed so as to maintain a correct positional relation when they are subjected to blow molding, and then, the parison and the handle are moved in the blow mold in such a state that the mouth portion of the parison and the runner for the handle are held with a predetermined positional relation.

Under the above-mentioned condition, the parison and the handle are simultaneously put in the blow mold in which the handle is set in a recess formed in the inner wall of the blow mold. Then, a pressurized fluid is supplied in the parison as in the usual manner, whereby a blown bottle with the handle attached to it at a correct position can be obtained.

Figure 1:
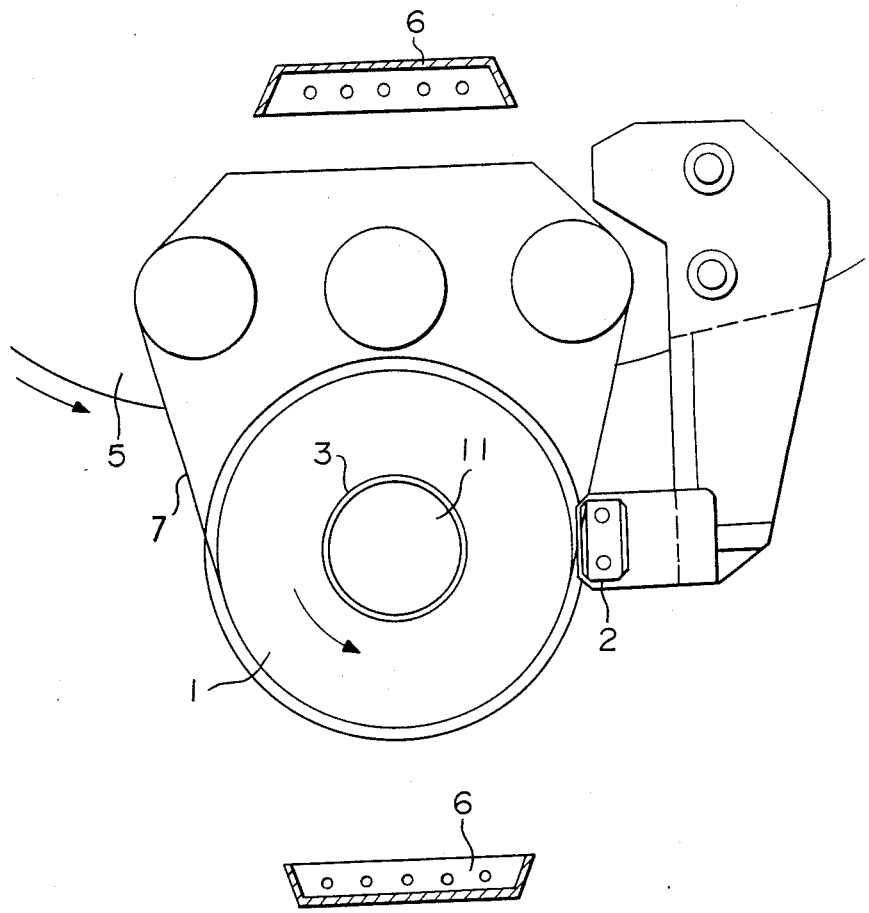
FIG. 1 is a plane view of an embodiment of the apparatus for forming a blown bottle with a handle to carry out the method of the present invention in which a parison holding unit and a handle holding unit are shown in detail.
Figure 2:
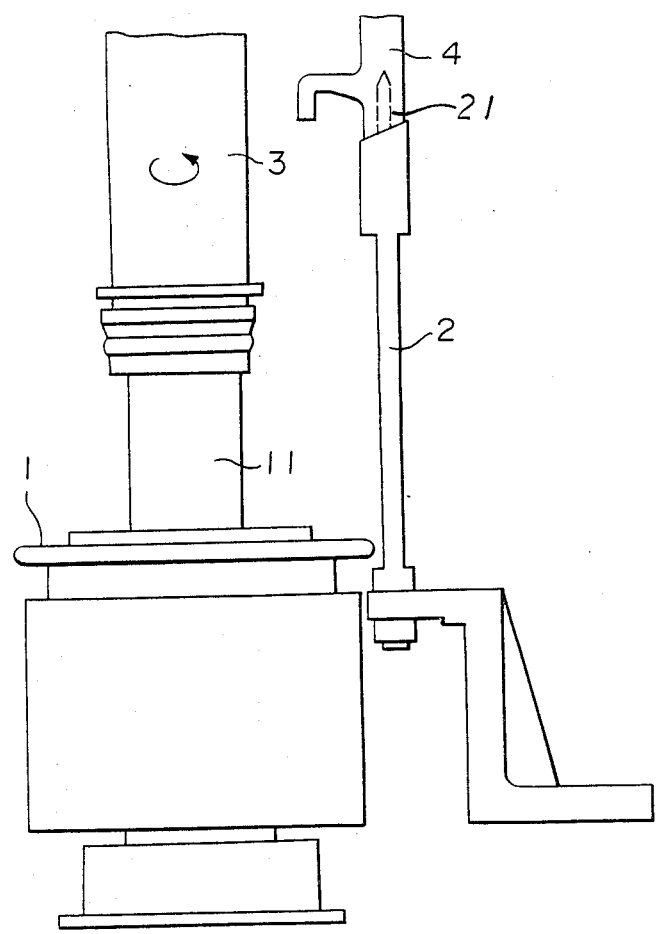
FIG. 2 is a front view of the holding units shown in FIG. 1.

FIG. 1 is an example showing an apparatus for forming a blown bottle with a handle to carry out a forming method according to the present invention.

In FIG. 1, reference numeral 5 designates a circularly transferring unit. A first holder 1 having a rotatable mandrel 11 is attached to a peripheral part of the transferring unit 5. The mandrel 11 is so adapted to support a parison 3 on it with the neck portion of the parison directing downwardly. A second holder 2 for supporting a handle 4 is also attached to the peripheral part of the transferring unit 5 in a non-rotatable manner. The first and second holders 1, 2 have a predetermined positional relation with respect to each other on the transferring unit 5. The first and second holders 1, 2 are moved circularly to a heating station and a blowing station as the transferring unit 5 is turned. Reference numerals 6 designates heaters.

In this embodiment, the parison and the handle are formed in separate steps, and the parison 3 is put on the mandrel 11 in an inverted state, i.e. the neck portion of the parison being directed downwardly. Then, the transferring unit 5 is circularly driven to thereby move the parison holder 1 with the parison 3 to the heating station, where the parison 3 is heated at a forming temperature by the heaters 6 while the mandrel 11 is rotated. Then, the handle 4 is fitted to a pin 21 of the handle holder 2 at a predetermined level. Then, the parison holder 1 and the handle holder 2 are simultaneously moved into the blow mold 8.

Figure 5:
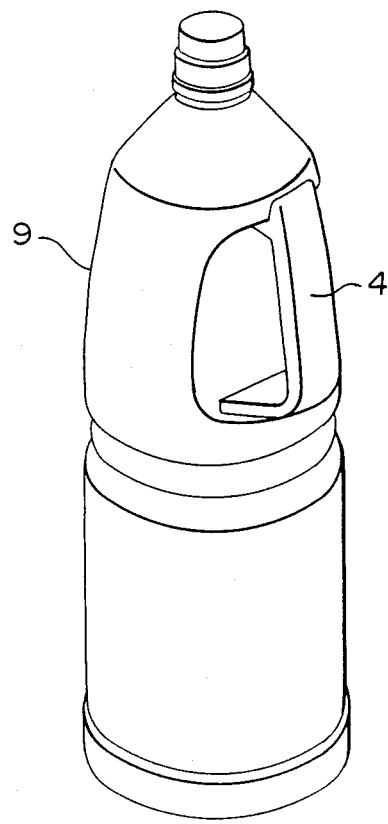
FIG. 5 is a perspective view showing an embodiment of the blown bottle with a handle obtained by the method of the present invention.

As shown in FIGS. 3 and 4, the blow mold 8 comprises a pair of half-cylindrical molds 81, 82. The parison 3 and the handle 4 are simultaneously moved into the half-cylindrical molds 81, 82, which are in an opened state, while they keep a predetermined positional relation, and then, they are closed. Then, a pressurized fluid is supplied into the parison as indicated by an arrow mark to expand the parison 3 to thereby have its shape correspond to the configuration of the blow mold 8. At the same time, the handle 4 is firmly connected to the trunk portion of the blown product. Thus, a blown bottle with a handle is formed as shown in FIG. 5.

In the above-mentioned embodiment, the handle and the parison are prepared separately and attached to the holders separately, but they are simultaneously transferred into the blow mold with the holders which are fixed on the transferring unit 5 at a predetermined positional relation.

Figure 6:
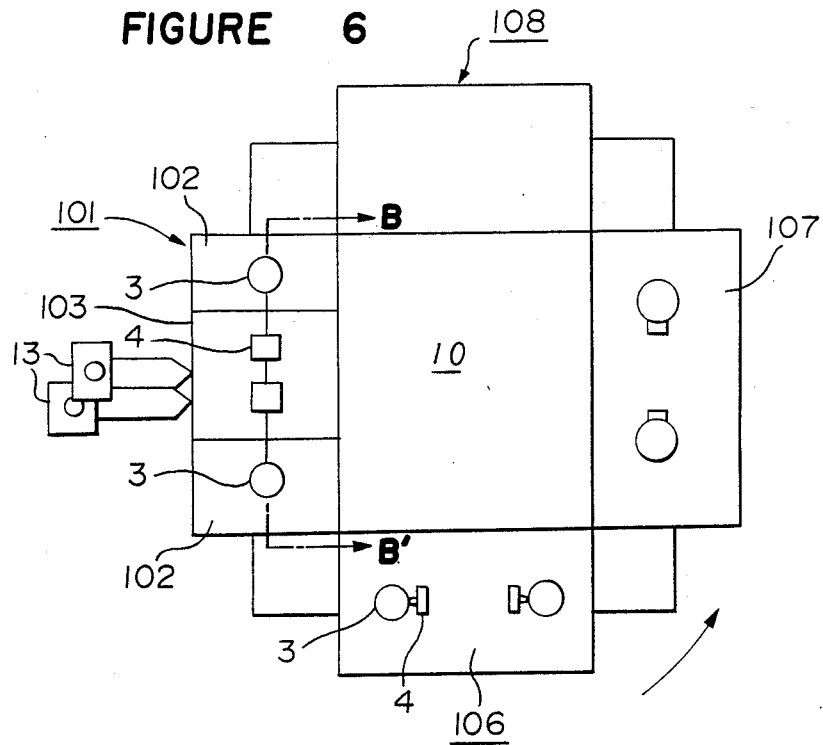
FIG. 6 is a diagram showing another embodiment of the apparatus for forming a blown bottle with a handle according to the present invention.
Figure 7:
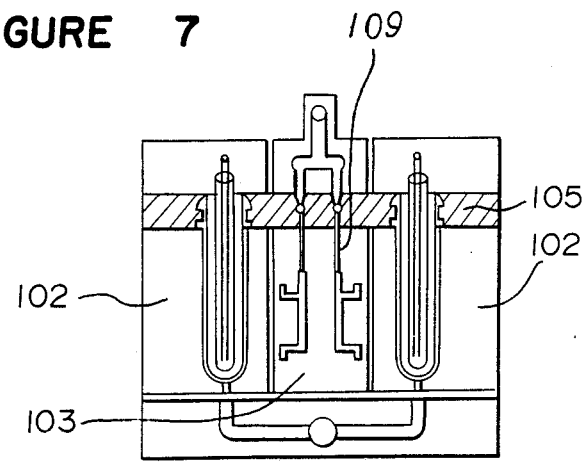
FIG. 7 is a cross-sectional view taken along a line B-B' in FIG. 6.

FIGS. 6 and 7 show another embodiment of the method of and the apparatus for forming a blown bottle with a handle according to the present invention. In this embodiment, an injection molding operation for the parison and the handle and a blow molding operation to form a blown bottle are conducted in series in an inline system.

A numeral 10 designates an inline injection and blow-molding apparatus which comprises an injection-molding station 101, a parison heating station 106, a blow-molding station 107 and a blown product removing station 108 which are circularly arranged around the transferring unit. In the injection-molding station 101, there are arranged a first injection mold 103 for forming the handle and second injection molds 102 for forming the parison 3 at both sides of the first injection mold 103 so that elements for blown bottles are obtainable. The cavity for the handles formed in the first injection mold 103 is so determined that the handle is connected to a predetermined position on the blown product. For this purpose, the length of the runners 109 for the handles is suitably determined. Under the above-mentioned condition, injection-molding is simultaneously or separately carried out for the parisons and handles by using an injection-molding machine 13. Then, each of the injection molds are opened. In this state, the mouth portion of each of the parisons 3 and the runner 109 of each of the handles 4 are respectively held by a holder plate 105 which constitute a part of the injection molds 102, 103, and the holder plate 105 with the parisons 3 and the handles 4 is transferred to the parison heating station 106. In the parison heating station 106, only the parisons are heated by a plurality of heaters (not shown) arranged so as to surround the parisons 3. Then, the parisons and the handles 4, each held by the holder plate 105, are simultaneously moved to the blow-molding station 107 to be put at their predetermined positions in the blow molds. After the blow molds are closed, blow molding is carried out. Then, the blow molds are moved to the blown product removing station 108, where the blow molds are opened, and the runners 109 for the handles are cut. Thus, blown bottles with a handle as shown in FIG. 5 are produced.

In accordance with the present invention, since the handle is held at a correct position with respect to the parison when blow molding is carried out, the handle is connected to the blown bottle at a correct position. Accordingly, a blown bottle with a handle can be easily produced without the problem of scattering of the products. When the parison and the handle are formed by injection-molding at predetermined positions, a blown bottle with a handle can be certainly and effectively produced by a single forming apparatus. Obviously, numerous modifications and variations of the present invention are possible in light of the above teachings. It is therefore to be understood that within the scope of the appended claims, the invention may be practiced otherwise than as specifically described herein.

We claim:

1. A method of forming a blown bottle having an integrally attached handle, said method comprising:
   heating a thermoplastic parison to a temperature suitable for molding;
   holding said parisons and said handle in a predetermined positional relationship by holding means;
   simultaneously moving said parison and said handle via said holding means into a blow mold while maintaining said predetermined positional relationship; and
   blowing a pressurized fluid into said parison, said parison expanding into contact with said handle thereby forming a blown bottle having a handle integrally attached thereto.

2. The method according to claim 1, further comprising setting said parison and said handle on respective holders, and moving the holders circularly to a parison heating station and then to a blowing station.

3. The method according to claim 1 further comprising setting said parison on a first holder prior to heating said parison, and setting said handle on a second holder so as to maintain said predetermined positional relationship to said parison.

4. The method according to claim 1 further comprising simultaneously forming said parison and said handle by injection in an injection mold and moving said parison and said handle circularly via said holding means to a heating station and then to a blowing station, said holding means comprising a holder plate which forms part of an injection cavity of said injection mold in which said parison and handle are formed.

5. The method according to claim 1 further comprising setting said parison on a rotatable holder and setting said handle on a non-rotatable holder.

* * * * *